United States Patent [19]

Williamson

[11] 4,241,612

[45] Dec. 30, 1980

[54] FLOWMETER

[75] Inventor: Roger J. Williamson, Harlow, England

[73] Assignee: ITT Industries, Inc., New York, N.Y.

[21] Appl. No.: 67,548

[22] Filed: Aug. 17, 1979

[30] Foreign Application Priority Data

Nov. 23, 1978 [GB] United Kingdom ............... 45756/78

[51] Int. Cl.³ ................................................ G01F 1/32
[52] U.S. Cl. ................................................. 73/861.22
[58] Field of Search .................... 73/194 VS; 356/129

[56] References Cited

U.S. PATENT DOCUMENTS

| 2,813,424 | 11/1957 | Liepmann | 73/194 |
| 4,011,754 | 3/1977 | Pitt | 73/194 |
| 4,206,642 | 6/1980 | Bearcroft | 73/194 |

Primary Examiner—Herbert Goldstein
Attorney, Agent, or Firm—A. Donald Stolzy

[57] ABSTRACT

A fluid flowmeter of the vortex shedding type. The vortices are detected from their optical Schlieren effect on a focused optical system, the vortex frequently giving a measure of fluid flow rate. The optical components of the flowmeter may be mounted within a wedge-shaped bluff body placed in the fluid stream.

3 Claims, 4 Drawing Figures

FLOWMETER

BACKGROUND OF THE INVENTION

This invention relates to fluid flowmeters, and more particularly to vortex shedding type meters wherein the vortices are detected by an optical Schlieren technique.

Small variations in fluid density, such as are caused by turbulence or vortices, result in local variations in the refractive index thus bending a light beam passing through such a vortex. The effect is commonly known as the Schlieren effect and is commonly employed in the examination of the flow of a fluid over a solid surface in wind tunnel equipment.

It is well known that when a bluff body is arranged in a stream, moving fluid vortices are shed from the body at a frequency corresponding to the fluid flow rate. Thus by detecting these vortices and measuring their frequency of propagation the fluid velocity may be determined. Optical detection of the vortices from their Schlieren effect measurement as light may be directed into and out of a fluid stream with minimal impedance to the fluid flow. Present Schlieren techniques, however, suffer from the problem that the detectors employed are insufficiently rigid to withstand vortex induced vibrations.

SUMMARY OF THE INVENTION

According to the present invention there is provided a flowmeter comprising: a housing; a bluff body mounted in said housing to cause vortex shedding; a converging lens mounted in said housing, said lens having a focus and an optical axis; a planar mirror mounted in said housing, said mirror being mounted perpendicularly to the optical axis of said lens; means for transmitting light beam from the lens focus such that said light beam, in the absence of fluid vortices, being reflected back to said focus; light detecting means disposed adjacent the lens focus; and a frequency meter coupled to said light detecting means, passage of a fluid vortex between said lens and said mirror defocusing said lens sufficiently to direct light reflected from said mirror to said light detector means.

BRIEF DESCRIPTION OF THE DRAWINGS

In the accompanying drawings which will illustrate exemplary embodiments of the present invention.

DESCRIPTION OF THE PREFERRED EMBODIMENT

Figure 1:
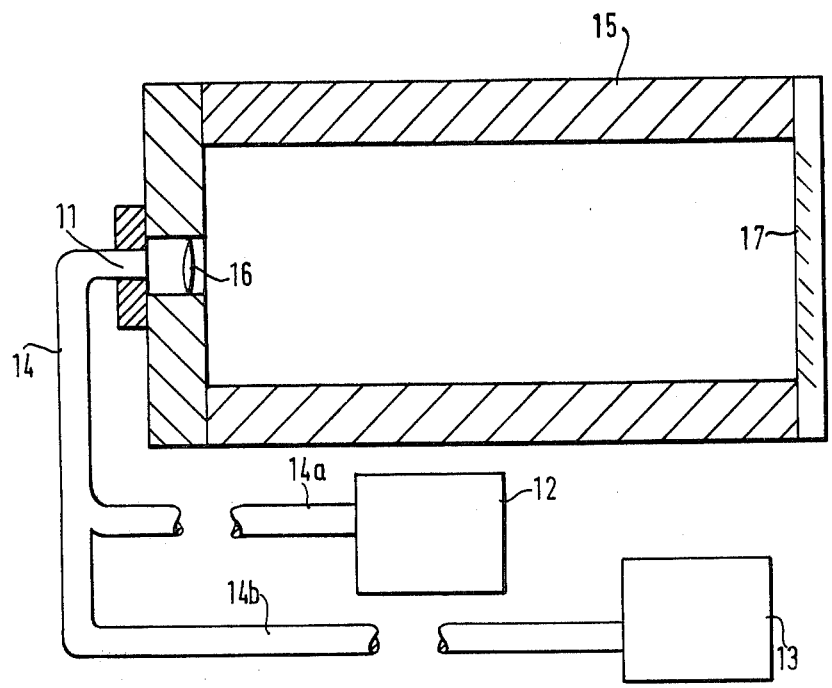
FIG. 1 is a schematic diagram of a Schlieren 25 effect flowmeter.

Referring to the drawings, the flowmeter of the present invention in FIG. 1 includes a detector head assembly 11 coupled to a light source 12 and a frequency meter 13 via a Y-type optical waveguide 14. Conveniently the waveguide 14 may be formed from two optical fiber bundles, one bundle carrying a transmitted light beam, and the other bundle the corresponding return beam. The detector head assembly 11 is mounted on a rigid frame 15 which, in use, is inserted into the fluid stream. The rigid frame 15 includes a convex lens 16 coupled to the waveguide 14 and a reflector 17. The end of the waveguide 14 is arranged at the focus of the lens 16 so that, when the detector head assembly 11 is immersed in the stationary fluid, light from the waveguide 14 is expanded into a parallel beam by the lens 16. The beam is reflected at the reflector 17 and refocused on the waveguide 14.

Figure 2:
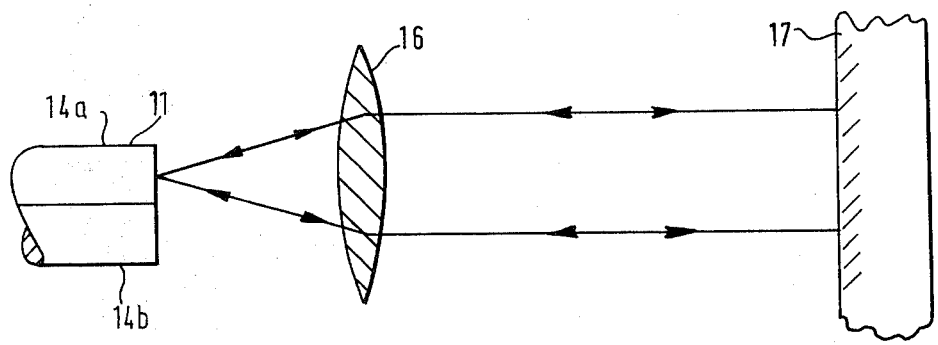
FIG. 2 shows a schematic diagram of an optical transmitter/receiver arrangement for the flowmeter of FIG. 1.

FIG. 2 shows the operation of the detector head arrangement 11 in more detail. As can be seen the waveguide 14 is divided into two portions 14a and 14b, one of which (14a) carries the transmitted light beam. The waveguide 14 is arranged with respect to the convex lens 16 such that light emitted from the portion 14a of the waveguide 14 is, in the absence of a fluid vortex between the lens 16 and the reflector 17, reflected back on to the portion 14a. Thus substantially no light is received by the portion 14b of the waveguide.

Passage of a vortex between the lens 16 and the reflector 17 causes a slight deviation of the light traversing the fluid therebetween thus slightly defocusing the arrangement and allowing a portion of the light to fall on the portion 14b of the waveguide 14. Thus, light signals are received by the portion 14b of the waveguide 14 at a frequency at which vortices are shed into the fluid. These light signals are detected and fed to the frequency meter 13 to give an indication of the fluid flow rate.

Figure 3:
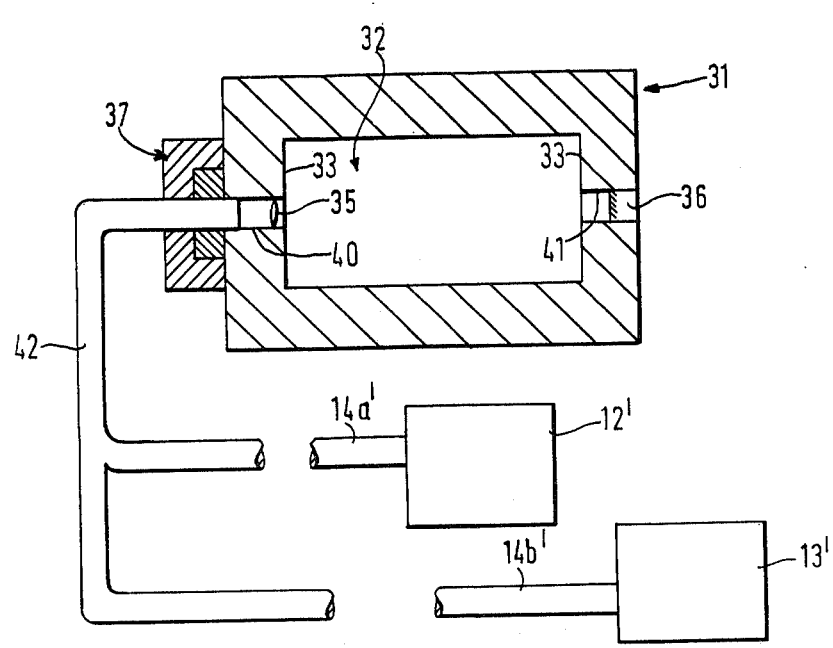
FIGS. 3 and 4 are side and plan respectively, of an alternative transmitter/receiver arrangement constructed in accordance with the present invention.
Figure 4:
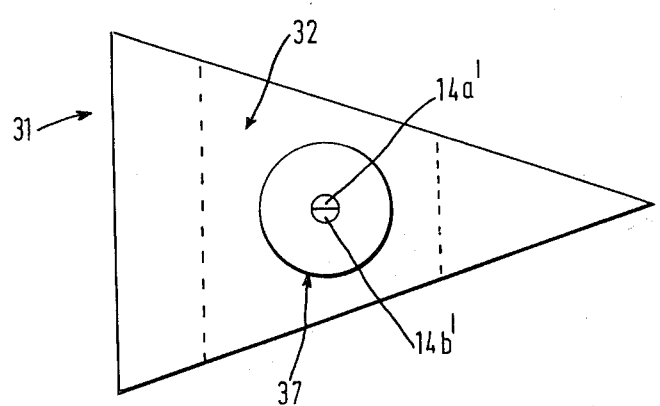

FIGS. 3 and 4 show an alternative detector construction in which the optical components are mounted within the bluff body. As shown in FIG. 3 there is a wedge shaped bluff body 31 which is provided with an opening 32 traversing the body between wedge faces 33 of the body. The body 31 is also provided with transverse bores 40 and 41 between the side faces 33 of the wedge and communicating with the opening 32. A converging lens 35 is secured in bore 40, bore 41 being closed by a mirror 36. It is preferred that the mirror 36 is planar although in some applications a concave mirror may be employed. As before the optical system is coupled via an optical fiber bundle 42 to remotely situated measuring equipment.

Advantageously the fiber bundle 42 may be coupled to the optical system via a demountable optical connector assembly 37 (FIG. 4), one member of which is mounted on the body 31.

As previously described, the lens and mirror again are so arranged that, when a fluid in which the body is immersed is motionless, light signals diverted along one portion of the fiber bundle are reflected and focused back on to that portion. Motion of the fluid causes vortices to be shed from the body 31, and portions of these vortices circulate through opening 32 in the body 31. This disturbance of the fluid in the opening 32 periodically defocuses the optical system causing light signals to fall on to the receiving portion of the fiber bundle. These signals then are fed to the frequency measuring arrangement 13.

Parts 14a', 14b', and 12' in FIG. 3 may, if desired, be identical to parts 14a, 14b and 12 shown in FIG. 1.

What is claimed:

1. A flowmeter comprising: a housing; a bluff body mounted in said housing to cause vortex shedding; a converging lens mounted in said housing; a planar mirror mounted in said housing, said mirror being mounted perpendicularly to the optical axis of said lens; means for transmitting light beam from the lens focus such that said light beam, in the absence of fluid vortices, being reflected back to said focus; light detecting means disposed adjacent the lens focus; and a frequency meter coupled to said light detecting means, passage of a fluid vortex between said lens and said mirror defocusing said lens sufficiently to direct light reflected from said mirror to said light detector means.

2. A flowmeter as claimed in claim 1, wherein an optical fiber bundle is provided such that said light beam is fed to and received from said lens and said mirror via said optical fiber bundle, and wherein said optical fiber bundle includes two groups of fibers, one group carrying a light beam to said lens and the other receiving said light beam from said lens.

3. A flowmeter as claimed in claim 1, wherein said lens and said mirror are mounted within said bluff body, said bluff body being provided with an opening through which vortices can circulate between said lens and said mirror.

* * * * *